United States Patent [19]

Sasaki et al.

[11] Patent Number: 4,797,769
[45] Date of Patent: Jan. 10, 1989

[54] DISC DRIVING DEVICE

[75] Inventors: Hiroaki Sasaki; Kazuo Hasegawa; Noboru Fukukawa; Masanori Yata, all of Furukawa, Japan

[73] Assignee: Alps Electric Co., Ltd., Japan

[21] Appl. No.: 188,655

[22] Filed: Apr. 29, 1988

Related U.S. Application Data

[63] Continuation of Ser. No. 856,636, Apr. 25, 1986, abandoned.

[30] Foreign Application Priority Data

Apr. 25, 1985 [JP] Japan ................................... 60-87538

[51] Int. Cl.$^4$ .............................................. G11B 5/012
[52] U.S. Cl. .................................................. 360/99.08
[58] Field of Search ...................................... 360/97–99

[56] References Cited

U.S. PATENT DOCUMENTS

| | | | |
|---|---|---|---|
| 4,573,093 | 2/1986 | Obama | 360/97 |
| 4,636,892 | 1/1987 | Friehauf | 360/97 |
| 4,654,725 | 3/1987 | Wakaizumi | 360/97 |
| 4,656,544 | 4/1987 | Yamanouchi | 360/97 |

*Primary Examiner*—A. J. Heinz
*Attorney, Agent, or Firm*—Guy W. Shoup; Paul J. Winters; Leighton K. Chong

[57] ABSTRACT

A disc driving device having a housing in which are formed by cutting a pair of front bearing portions in the vicinity of a disc drive motor mounting hole and a pair of rear bearing portions at predetermined distances from the front bearing portions, characterized in that a cutting tool relief slot contiguous to the rear bearing portions and deeper than a cutting allowance for those rear bearing portions is provided in the housing so that a cutting tool can move efficiently along the relief slot when it is moved from one rear bearing portion to the other.

3 Claims, 2 Drawing Sheets

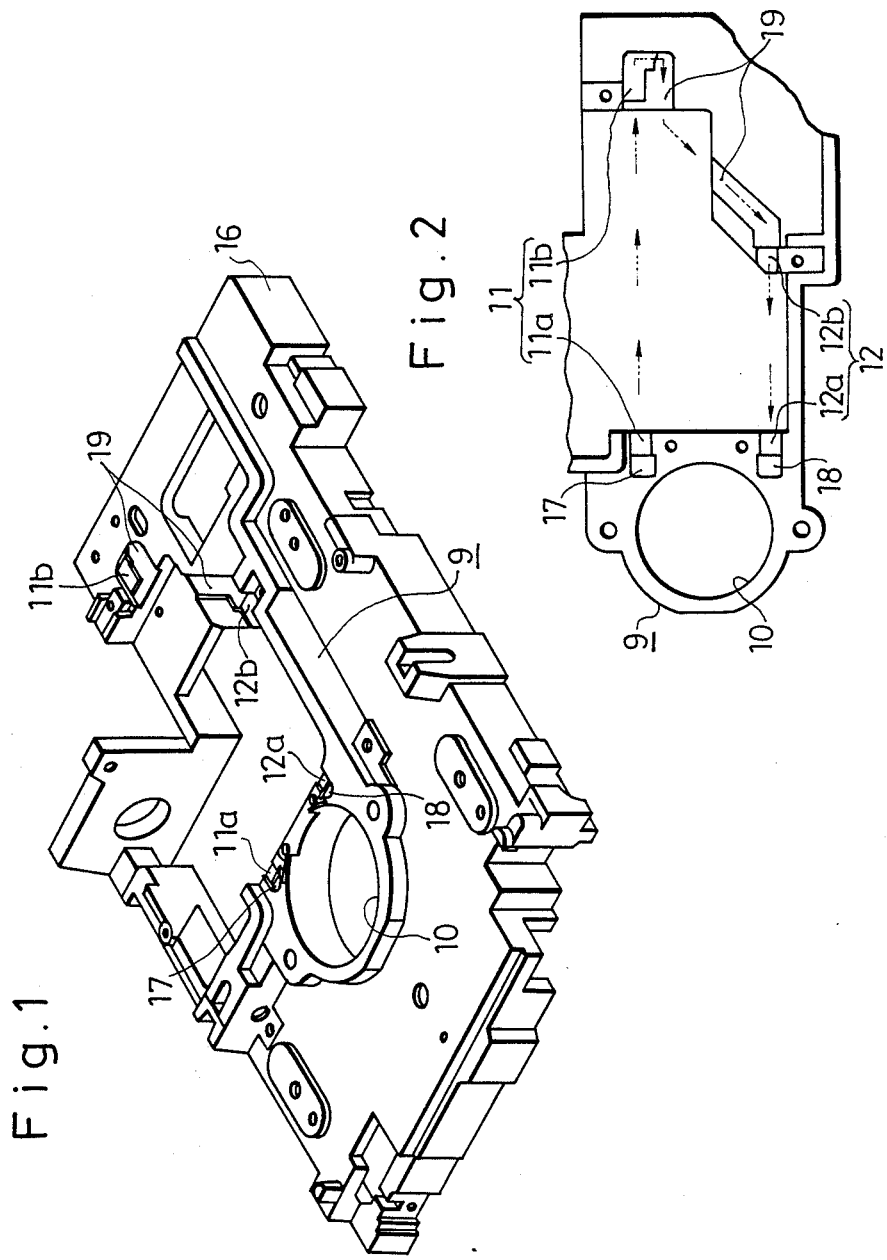

DISC DRIVING DEVICE

This is a continuation application from application Ser. No. 856,636 filed Apr. 25, 1986, now abandoned.

BACKGROUND OF THE INVENTION

1. Field of the Invention

The present invention relates to a disc driving device and particularly to an improvement of a housing of a disc driving device.

2. Description of the Prior Art

FIG. 3 is an exploded perspective view showing a carriage assembly and a housing in a conventional disc driving device.

In the same figure, the reference numeral 1 denotes a carriage assembly. The carriage assembly 1 is generally constituted by connecting through a hinge portion 6 a carriage 2 which carries thereon a lower magnetic head 4 and an arm 3 which holds an upper magnetic head 5. The arm 3 is capable of being opened and closed in the direction of arrow A relative to the carriage 2. In place of the upper magnetic head 5, a pad may be attached to the arm 3. Numerals 7 and 8 denote first and second guide shafts, respectively. The guide shafts 7 and 8 are slidably inserted into the carriage 2 and fixed to a later-described housing 9. By the use of a stepping motor (not shown) and a screw shaft which is driven by the motor, the carriage assembly 1 is moved in the direction of arrow B, namely, in a radial direction of a disc, while being guided by the paired guide shafts 7 and 8.

In the housing 9 is formed a disc driving motor mounting hole 10. Moreover, a pair of front bearing portions 11a and 12a are positioned near the mounting hole 10, and a pair of rear bearing portions 11b and 12b are formed in positions spaced by predetermined distances from the front bearing portions 11a and 12a. The front bearing portion 11a and a rear bearing portion 11b which are located in opposed positions constitute a first bearing portion 11 to support both end portions of the first guide shaft 7. Likewise, the front bearing portion 12a and the rear bearing portion 12b constitute a second bearing portion 12 to support both end portions of the second guide shaft 8. More specifically, both end portions of the first guide shaft 7 and those of the second guide shaft 8 are fixed onto the first and second bearing portions 11 and 12, respectively, by fixing shaft pressing pieces 13, 14 and 15 with bolts in the directions of P, Q and R as shown in the figure.

When the disc is placed on a turntable which is driven by a disc driving motor (not shown), and is rotated in a predetermined fashion, the carriage assembly 1 is moved in the direction of arrow B, namely, in a radial direction of the disc, with the disc held between the upper and lower magnetic heads 5 and 4, to effect a desired recording or reproducing operation.

The housing in such disc driving device has a predetermined shape obtained by a secondary machining after die casting from an aluminum alloy, for example. During this secondary machining, the first and second bearing portions 11 and 22 are formed accurately using a cutting tool. At this time, if the machining accuracy of the bearing portions 11 and 12 is not sufficiently high, there may arise an error in the contact pressure between the upper and lower magnetic heads 4, 5 and a recording surface of the disc, or a movement error exceeding a predetermined amount, which would exert a bad influence on the product performance.

However, the construction of the housing 9 in the conventional disc driving device requires a cutting tool to be moved along an underside path when shifting the cutting tool from one bearing portion 11 (or 12) to the other bearing portion 12 (or 11) in the secondary machining, thus resulting in deterioration of the machining accuracy or increase of the machining time. More particularly, when effecting a cutting operation from the first bearing portion 11a to the second bearing portion 11b, it is necessary to follow such a path as shown in a schematic plan view of FIG. 1 in which a cutting tool is moved horizontally from the front bearing portion 11a to the rear bearing portion 11b, then once raised, thereafter brought down into the rear bearing portion 12b of the second bearing portion 12, and then moved horizontally up to the front bearing portion 12a. such ascending and descending motions (indicated by broken line arrows in the figure) of the cutting tool involve backlash, so the machining accuracy is deteriorated; besides, the operation becomes more complicated, causing an increased working time. As an alternative route, after completion of the cutting operation for the first bearing portion 11, the cutting tool is moved back from the rear bearing portion 11b and moved horizontally to the second bearing portion 12. In this case, however, the degree of area will turn worse markedly because of re-cutting of an already cut face.

SUMMARY OF THE INVENTION

It is the object of the present invention to provide a disc driving device having a housing so constructed as to be capable of eliminating the abovementioned drawbacks of the prior art, improving the machining accuracy for bearing portions which are formed by cutting to support carriage moving guide shafts, and shortening the time required for such machining.

According to the present invention, in order to achieve the above object, there is provided a disc driving device having a housig in which are formed by cutting a pair of front bearing portions in the vicinity of a disc driving motor mounting hole and a pair of rear bearing portions at predetermined distances from the front bearing portions, characterized in that a cutting tool relief slot contiguous to the rear bearing portions and deeper than a cutting allowance for those rear beating portions is provided in the housing so that a cutting tool can move efficiently along ythe relief slot when it is moved from one rear bearing portion to the other.

BRIEF DESCRIPTION OF THE DRAWINGS

FIG. 1 is a perspective view of a housing of a disc driving device embodying the invention;

FIG. 2 is a schematic plan view thereof;

DESCRIPTION OF A PREFERRED EMBODIMENT

An embodiment of the present invention will be described hereinunder with reference to the drawings.

Figure 3:
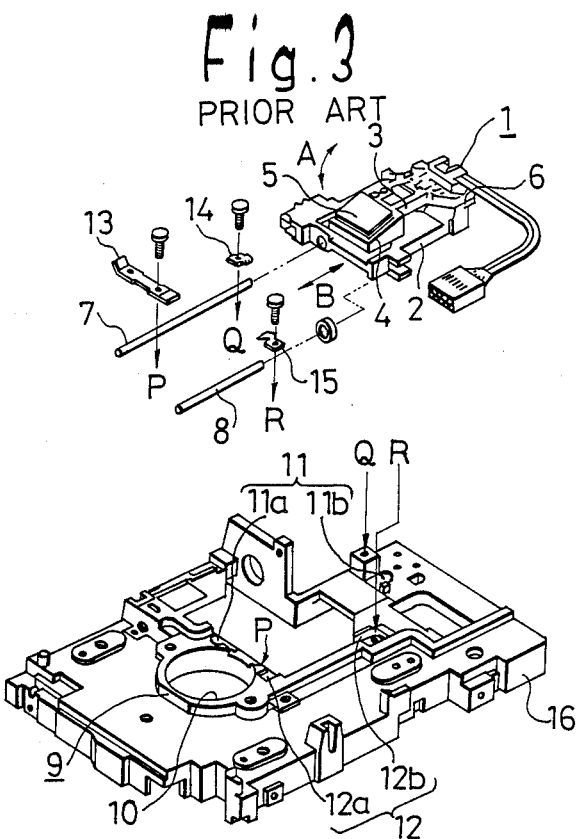
FIG. 3 is an exploded perspective view of a carriage assembly and a housing in a conventional disc driving device.
Figure 4:
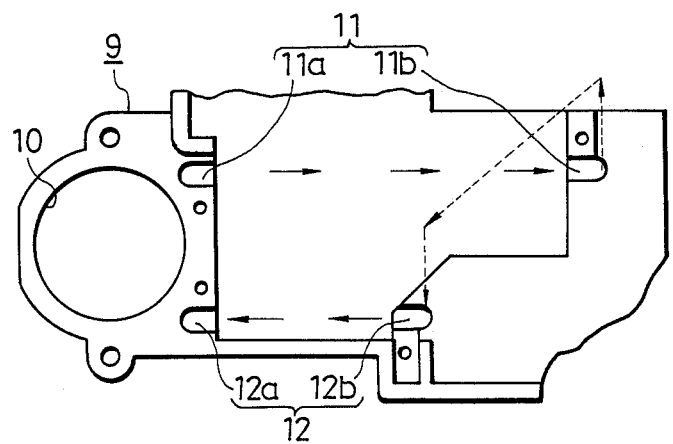
FIG. 4 is a schematic plan view of the housing shown in FIG. 3.

Referring to FIGS. 1 and 2, there is illustrated a housing of a disc driving device embodying the invention in perspective view and schematic plan view, respectively, in which the portions corresponding to those shown in the previously-explained FIGS. 3 and 4 are indicated by the same reference numerals.

In FIGS. 1 and 2, a housing 9 has a predetermined shape obtained by a secondary machining after die casting from an aluminum alloy. The housing 9 is formed with a disc driving motor mounting hole 10. Moreover, a pair of front bearing portions 11a and 12a positioned near the mounting hole 10 and a pair of rear bearing portions 11b to 12b positioned at predetermined distances from the front bearing portions 11a, 12a are formed in the housing 9 accurately using a cutting tool during the secondary machining. The front bearing portion 11a and the rear bearing portion 11b, located in opposed positions, constitute a first bearing portion 11. Likewise, the front bearing portion 12a and the rear bearing portion 12b constitute a second bearing portion 12. Both end portions of one carriage moving guide shaft are supported by the first bearing portion 11, while both end portions of the other guide shaft are supported by the second bearing portion 12.

Further, a pair of relief portions 17 and 18 which are adjacent to the paired front bearing portions 11a and 12a, as well as a relief slot 19 contiguous to the paired rear bearing portions 11b and 12b, are formed in predetermined sizes in the housing 9 by die casting. The relief portions 17 and 18 are concaves for relief of the cutting tool at the beginning or end of a secondary machining for the front bearing portions 11a and 12a. The relief slot 19 is for relief of the cutting tool from one rear bearing portion 11b (or 12b) to the other rear bearing portion 12b (or 11b) during the secondary machining. The relief portions 17 and 18 and the relief slot 19 are formed deeper by predetermined amounts than the cutting allowance in the secondary machining for the bearing portions 11 and 12. In this embodiment, the cutting tool diameter and machining width in the secondary machining are 4 mm and 4.6 mm (cutting allowance: 0.3 mm), respectively, while in die casting the relief portions 17 and 18 are set to 5 mm wide, 4.5 mm long and 0.5 mm deep, the relief slot 19 to 5 mm wide and 0.5 mm deep, and the bearing portions 11 and 12 to 4 mm in width.

Thus the relief slot 19 deeper than the cutting allowance for the first and second bearing portions 11 and 12 and contiguous to the rear bearing portions 11b and 12b is formed by die casting, so in the secondary machining the cutting tool can be moved horizontally and without retrogression from one rear bearing portion 11b (or 12b) to the other rear bearing portion 12b (or 11b). More particularly, as shown in FIG. 2, in the case of cutting from the first bearing portion 11 to the second bearing portion 12, the cutting tool is moved from the relief portion 17 to the front bearing portion 11a and further to the rear bearing portion 11b horizontally, then moved horizontally in the arrowed direction along the relief slot 19 until reaching the rear bearing portion 12b of the second bearing portion 12, then further moved horizontally to the front bearing portion 12a and the relief portion 18, whereby a desired cutting is completed. In other words, for cutting the first and second bearing portions 11 and 12, the cutting tool can be moved horizontally like a sketch with one stroke along the arrowed path in FIG. 2 and thus unlike the prior art it is not necessary to raise, lower or turn back the cutting tool. Consequently, the machining accuracy is improved remarkably; besides, the machining time can be shortened to a great extent by providing the relief slot 19 in an approximately shortest path between the rear bearing portions 11b and 12b as in this embodiment.

According to the resent invention, as set forth hereinabove, a cutting tool relief slot is formed in the housing prior to the secondary machining, and when a cutting tool is moved from one rear bearing portion to the other during the secondary machining, the cutting tool can be moved horizontally and along the relief slot and without retrogression, i.e. stopping and starting the cutting tool to move in reverse or along a different axis. Consequently, it becomes possible to improve the machining accuracy, thereby enhance the product performance, and shorten the machining time, thus leading to reduction of cost.

What is claimed is:

1. A disc driving device comprising:
   a carriage carrying a magnetic head thereon for movement radially of a disc along a first, horizontal direction of the disc driving device while sliding on a pair of parallel guide shafts extending in the first, horizontal direction; and
   a housing for mounting parts of the disc driving device, said housing including a pair of front bearing portions spaced apart from each other in a second horizontal direction perpendicular to said first horizontal direction, each of said front bearing portions being spaced apart and facing opposite a respective one of a pair of rear bearing portions along said first horizontal direction, each of said rear bearing portions corresponding in position to the respective one of said front bearing portions for accurately holding front and rear ends of the respective ones of said pair of guide shafts so that they are mounted in parallel for movement of said carriage thereon, each of said front bearing portions and rear bearing portions being open toward one vertical direction and having a bearing width facing said vertical direction which is suitable for journalling a corresponding end of a respective one of said guide shafts therein;
   wherein said rear pair of bearing portions consists of a first rear bearing portion and a second bearing portion, each of said first and second rear bearing portions having a front side facing the corresponding one of said front bearing portions and a rear side facing opposite therefrom,
   and said housing further including a relief slot extending from the rear side of the first rear bearing portion then across said second horizontal direction to the rear side of the second rear bearing portion, said relief slot being open toward said vertical direction and having a relief width larger than said bearing width,
   whereby said front and rear pairs of bearing portions are all machined by a cutting tool oriented in said vertical direction and moving in one continuous horizontal movement without backtracking by moving from one of said front bearing portions along the first horizontal direction through the first rear bearing portion to the rear side thereof, then along the relief slot having said larger relief width across the second horizontal direction, to the rear side of and through the second rear bearing portion, then back along the first horizontal direction to the other one of said front bearing portions.

2. A disc driving device according to claim 1, wherein said relief slot is formed by die casting.

3. A disc driving device according to claim 1, wherein said relief slot is formed in an approximately shortest path between both said rear bearing portions.

* * * * *